United States Patent
Schumacher

(10) Patent No.: US 11,174,687 B2
(45) Date of Patent: Nov. 16, 2021

(54) DEVICE FOR CLAMPING AN ELEMENT, CARRIAGE FOR A GROUND DRILLING DEVICE, GROUND DRILLING DEVICE, METHOD FOR CLAMPING AN ELEMENT AND METHOD FOR THE MANUFACTURE OF A DEVICE FOR CLAMPING AN ELEMENT

(71) Applicant: TRACTO-TECHNIK GmbH & Co. KG, Lennestadt (DE)

(72) Inventor: Philipp Schumacher, Lennestadt (DE)

(73) Assignee: TRACTO-TECHNIK GMBH & CO. KG, Lennestadt (DE)

( * ) Notice: Subject to any disclaimer, the term of this patent is extended or adjusted under 35 U.S.C. 154(b) by 375 days.

(21) Appl. No.: 15/478,748

(22) Filed: Apr. 4, 2017

(65) Prior Publication Data

US 2017/0292335 A1 Oct. 12, 2017

(30) Foreign Application Priority Data

Apr. 7, 2016 (DE) .................... 10 2016 003 996.5

(51) Int. Cl.
| | |
|---|---|
| *F16L 21/00* | (2006.01) |
| *E21B 17/06* | (2006.01) |
| *E21B 4/06* | (2006.01) |
| *E21B 7/20* | (2006.01) |
| *F16L 55/11* | (2006.01) |
| *E21B 11/02* | (2006.01) |
| *E21B 7/04* | (2006.01) |

(52) U.S. Cl.
CPC ............... *E21B 17/06* (2013.01); *E21B 4/06* (2013.01); *E21B 7/20* (2013.01); *E21B 11/02* (2013.01); *F16L 21/00* (2013.01); *F16L 21/002* (2013.01); *F16L 55/11* (2013.01); *E21B 7/046* (2013.01)

(58) Field of Classification Search
CPC ............................. F16L 21/002; F16L 17/10
See application file for complete search history.

(56) References Cited

U.S. PATENT DOCUMENTS

| | | | | |
|---|---|---|---|---|
| 672,475 | A * | 4/1901 | Cavallaro ............... | B09C 1/002 |
| | | | | 166/125 |
| 1,586,923 | A | 6/1926 | Townsend | |
| 1,930,361 | A * | 10/1933 | Kilmer, Jr. ............. | E21B 33/06 |
| | | | | 251/5 |
| 2,465,848 | A * | 3/1949 | Collins ................... | E21B 33/08 |
| | | | | 166/77.51 |
| 2,742,305 | A * | 4/1956 | Converse, III .......... | F16L 17/10 |
| | | | | 277/605 |
| 2,822,192 | A * | 2/1958 | Beatty .................... | F16L 17/10 |
| | | | | 277/626 |
| 3,023,995 | A * | 3/1962 | Hopkins ................. | F16L 17/10 |
| | | | | 192/85.13 |

(Continued)

FOREIGN PATENT DOCUMENTS

| | | |
|---|---|---|
| DE | 2166177 A1 | 5/1973 |
| DE | 2814915 A1 | 10/1978 |

(Continued)

*Primary Examiner* — David Bochna
(74) *Attorney, Agent, or Firm* — Howard IP Law Group

(57) ABSTRACT

A device for clamping an element includes a pressure chamber having a flexible wall section with an elastic jacket and a rigid wall section that acts as a counter-bearing. The jacket is provided with a contact surface to connect with the element.

27 Claims, 3 Drawing Sheets

(56) References Cited

U.S. PATENT DOCUMENTS

| | | | | |
|---|---|---|---|---|
| 3,190,679 A * | 6/1965 | Lester | F16L 17/10 138/93 |
| 3,215,454 A * | 11/1965 | Hayes | E21B 17/01 166/340 |
| 3,420,554 A * | 1/1969 | Straub | B21D 39/04 285/104 |
| 3,429,587 A * | 2/1969 | Kish | F16L 17/10 285/18 |
| 3,574,360 A * | 4/1971 | Grawey | F16L 33/207 277/605 |
| 3,582,112 A * | 6/1971 | Pico | F16L 17/10 285/105 |
| 3,695,637 A * | 10/1972 | Satterthwaite | F16L 17/10 285/145.2 |
| 3,810,665 A * | 5/1974 | Rodgers | F16L 17/10 285/105 |
| 4,026,584 A * | 5/1977 | Lowe | F16L 17/10 285/369 |
| 4,052,861 A * | 10/1977 | Malone | E02B 17/0008 405/224.2 |
| 4,081,599 A * | 3/1978 | Cookson | H02G 5/063 174/13 |
| 4,252,150 A * | 2/1981 | Morley, Jr. | F16L 37/06 137/798 |
| 4,276,945 A * | 7/1981 | Ward, Sr. | E21B 21/08 175/209 |
| 4,305,591 A * | 12/1981 | de Sivry | B23K 15/06 277/646 |
| 4,373,377 A * | 2/1983 | Smith | F16J 15/46 285/97 |
| 4,772,050 A * | 9/1988 | Buehler | F16L 7/02 277/605 |
| 4,786,087 A * | 11/1988 | Thewlis | F16L 17/10 285/288.7 |
| 5,333,916 A * | 8/1994 | Burkit | F16L 17/10 138/99 |
| 5,924,743 A * | 7/1999 | Bonmartin | F16L 55/163 277/331 |
| 8,544,894 B1 * | 10/2013 | Borba | F16L 17/10 141/287 |
| 8,882,154 B1 * | 11/2014 | Howell | F16L 37/62 138/99 |
| 2013/0028664 A1 | 1/2013 | Cherrington | |

FOREIGN PATENT DOCUMENTS

| | | |
|---|---|---|
| GB | 2088512 A | 6/1982 |
| GB | 2140528 A | 11/1984 |

\* cited by examiner

DEVICE FOR CLAMPING AN ELEMENT, CARRIAGE FOR A GROUND DRILLING DEVICE, GROUND DRILLING DEVICE, METHOD FOR CLAMPING AN ELEMENT AND METHOD FOR THE MANUFACTURE OF A DEVICE FOR CLAMPING AN ELEMENT

CROSS-REFERENCE TO RELATED APPLICATIONS

This application claims priority pursuant to 35 U.S.C. 119(a)-(d) to German Application No. 10 2016 003 996.5 filed Apr. 7, 2016, the entire contents of which are incorporated herein by reference for all purposes.

FIELD OF THE INVENTION

The invention concerns a device for clamping an element, a carriage for a ground drilling device, a ground drilling device, a method for clamping an element and a method for the manufacture of a device for clamping an element.

BACKGROUND OF THE INVENTION

Ground drilling devices, in particular horizontal drilling devices, are used to create earth boreholes without digging trenches, for example for supply and waste lines, or to replace already installed old lines without digging a trench. A drill rod comprising short lengths of rods is usually used to create earth boreholes, wherein the short rods may be connected to each other and to a drilling head and/or a drive.

The ground drilling device may in particular be a percussion drilling device, which is used in particular to create horizontal earth boreholes. The percussion drilling device is usually driven by way of a main piston that is moved back and forth inside a housing where it impacts on either a front or a rear striking surface, depending on the desired movement direction of the percussion drilling device. The kinetic energy thus transferred by the main piston causes the acceleration of the percussion drilling device in the soil.

Particularly in these kinds of earth drilling devices the problem exists where an element with an external cylindrical shape, while swinging in axial direction, needs to be at times locked or clamped respectively.

The document DE 21 66 177 A discloses a locking or clamping method respectively by means of a non-return device, which comprises two shoes that are retained in spring-loaded parallel guide rods. The housing of the percussion drilling device may be moved between the shoes in an open position. The design of the non-return device known from DE 21 66 177 A is complex.

SUMMARY OF THE INVENTION

It is thus the object of the invention to provide a device for clamping an element, in particular an elongated element with a circular outer contour, with a simple design.

This object is met by the embodiments described herein. Advantageous embodiments are described below.

It is the object of the invention to provide a pressure chamber with a flexible wall section that may brought into contact with the element. The element to be clamped may be surrounded, in particular at least partially, in circumferential direction by a flexible wall section. The pressure chamber may be filled with a pressure medium, for example compressed air. A device of this kind is of simple design and comprises, besides the elastic jacket of the pressure chamber, a rigid wall section that acts as counter-bearing.

According to a further object of the invention, the device for clamping an element comprises a radial force element for forming a pressure-tight connection between the jacket and the counter-bearing. This permits the construction of a particularly simple device, which reduces the number of elements required for the device as well as the time required for assembly.

The invention provides a device for clamping an element, wherein the device comprises a pressure chamber, which may be filled in particular with a pressure medium, for example compressed air. The pressure chamber comprises a flexible wall section with an elastic jacket and a rigid wall section that acts as counter-bearing. The jacket is provided with a contact surface to connect with the element. The elastic jacket is thus in direct contact with the element that needs to be locked or clamped respectively. The elastic jacket may be made in particular from an airtight material.

Furthermore, the invention provides a device for clamping an element that has a pressure chamber that comprises a flexible wall section with an elastic jacket and a rigid wall section that acts as counter-bearing. The device, moreover, is provided with a radial force element for establishing a pressure medium-tight connection between the jacket and the counter-bearing. The elastic jacket may in addition be provided with a contact surface to connect with the element. The radial force element facilitates the pressure-joining of the elastic jacket between the radial force element and the rigid wall section. It was recognized that it is possible to create a pressure chamber through pressure-joining of the elastic jacket with the rigid wall section. In particular, it may be sufficient to apply a radial force for pressure-joining the elastic jacket with the rigid wall section. In particular, two radial force elements may be provided on the device, which are disposed at a distance in longitudinal direction of the element to be clamped or locked.

The element to be clamped may be an elongated, cylindrical element. The element to be clamped may be a housing of a ground drilling device, in particular a percussion drilling device (displacement hammer). The element to be clamped may have a rounded, in particular elliptical or circular cross-section perpendicular to the longitudinal direction of the element to be clamped. In order to create a fluid connection, the device may also be used with a connector in form of a pipe or tube. The device according to the invention may have a fluid-tight connection between the device and the pipe or tube respectively. For example, a pipe or tube may be connected to one end of the device, wherein the device may have or form part of a fluid line, and the pipe or the tube may be a transition or section to another part of the fluid line. A section extends from the flexible wall and/or the rigid wall, in particular from the rigid wall, in longitudinal direction of the wall that may form part of the fluid line with its inner contour. Preferably, the rigid wall section may extend over the range of the pressure chamber and form a part of the fluid line, and/or extend over a section and form part of the fluid line. The elastic jacket is preferably arranged around the wall section, and the clamping action causes the fastening of a section of the fluid line, which is at least partly formed by the device. The fluid line may be a bypass.

Multiple devices may be provided for clamping the element to be clamped. For example a displacement hammer may be clamped by means of two or more devices that are located at a distance from each other. The devices may be fastened to a carriage. The devices may be moveable in tracks on the carriage, in particular on a framework of the carriage. A translational motion of the device in tracks may be preferred in particular, wherein the guides may be oriented essentially vertical to be able, for example, to move the displacement hammer vertically in a launch pit on or in the carriage. The selective "clamping" of the displacement hammer and an independent translational movement of the device may lead to different inclinations of the displacement hammer, in particular with respect to the horizontal.

Provision may be made to adjust a varying degree of clamping force through controlled application of pressure to the pressure chamber. At least one intermediary state is possible in which a pressure is set that is less than the clamping force, wherein a frictional connection may be made although the displacement hammer is operated. In said intermediary state the displacement hammer is able to move during operation; the displacement hammer is subjected to mantle friction/static friction.

The device may be used for a number of different sizes and/or shapes of an element to be clamped since the elastic jacket is able to adapt to the outer contour of the element to be clamped. The element to be clamped may have different shapes and/or different diameters.

According to the invention, the term "clamping" includes the formation of a frictional connection. A frictional connection may in particular be made between the elastic jacket and the element to be clamped. The element to be clamped may be surrounded fully or partially along its circumference by the elastic jacket. A seal may be achieved between the element to be clamped and the elastic jacket by way of the clamping action. A material transfer at the clamping location along the element to be clamped may be prevented. The clamping may form a barrier on the outside or the inside of the element to be clamped. For example, the device may be inserted into or over an end of a separated supply line or waste line and clamped or locked respectively to the end.

In a preferred embodiment the rigid wall section has a tubular form, which means that an easily manipulable and easy to manufacture element may be used. The term "tubular" includes an elongated hollow body, the length of which may be greater than its diameter. A tubular wall is suitable for clamping an elongated element wherein the cross-section of the rigid wall may be chosen such that surplus material is avoided. The material of the rigid wall may be steel, a non-ferrous metal, plastic or similar material that exhibits a certain strength.

In a preferred embodiment the radial force element is provided with an annular section so that the radial force element may take the form of a section or a segment of a pipe. The radial force element has a diameter that is smaller than the diameter of the rigid wall in that section in which the elastic jacket is pressure-joined between the rigid wall and the radial force element. The radial force element may be made from any material that is plastically deformable. It is preferable to use a commercially available type of steel.

The solution according to the invention has the advantage that a wide range of dimensions in terms of length as well as diameter of the rigid wall and/or the elastic jacket as well as the radial force element can be covered. It is possible to achieve very small as well as very large dimensions. Concerning the radial force element, a greater width of the radial force element may be used to facilitate the application of a greater force.

In a preferred embodiment the counter-bearing is disposed around the jacket, so that the elastic jacket, which is located within the element that forms the rigid wall, moves inwards as soon as compressed air is applied to the pressure chamber. The element to be clamped is then located within the rigid wall section or counter-bearing respectively; the rigid wall may surround the elastic jacket along a longitudinal section.

In a further preferred embodiment the jacket is disposed around the counter-bearing in the area of the pressure chamber so that the rigid wall section is surrounded by the elastic jacket and the radial force element presses the elastic jacket outside against the rigid wall section. In this instance the elastic jacket is effective in outward direction against the rigid wall section that acts as counter-bearing.

In a preferred embodiment the elastic jacket is made of a single-layer. In this instance the elastic jacket may be made from a single material. The material used for the elastic jacket may be an elastic, single or multi-layer material. The material used may in particular be a synthetic rubber, preferably nitrile rubber. NBR (Nitrile Butadiene Rubber) has the advantage to be highly resistant against oil, grease and hydrocarbons, has a favorable ageing behavior and is wear-resistant.

In a preferred embodiment the device comprises a sealing element, which may form a seal or a stopper. In the area of the pressure chamber or at the edge of the pressure chamber, a sealing element may be provided that makes contact with the elastic jacket or with the counter-bearing, wherein said sealing element contacts with its edge the elastic jacket or the rigid wall section. The sealing element provides a seal at the edge with the elastic jacket or the rigid wall. By means of the sealing element the elastic jacket may be pressed in the direction of the rigid wall section, or a force is applied directly by the sealing element onto the rigid wall section. By means of the sealing element, the formation of a stopper for the device for clamping an element is achievable. It may also be that the sealing element is provided with an opening, preferably in the center, through which a pipe or hose may be passed, so as to accommodate the pipe or the hose. The opening may be fitted with a connector. This allows, for example, for the provision of a fluid line in that the device for clamping an element, which may take a tubular form, is provided with a connection that fastens the pipe or the hose. From the other side a further line element or connector for the fluid may lead into the connection or into the device. A connector in form of a pipe or tube, which is passed through the opening, may be inserted. The opening in the sealing element may be provided with sealing means to seal the connector in the sealing element. In the course of repair work on a supply line or waste line it is possible, for example, to form a bypass to another end of a severed line. The opening of the sealing element may be provided with an internal or external thread into which the connector may be screwed. Besides a detachable connection of the connector with the sealing element, the connector may also be welded to the sealing element, or the two may be manufactured as a single piece. It is also possible to design the rigid wall section directly as a connector.

In a preferred embodiment the elastic jacket is made from a laminated multi-layer material, so that the elastic jacket consists in at least a partial section of multiple layers.

In a preferred embodiment the above-named device is used in a carriage for a ground drilling device, wherein the term "carriage" includes, according to the invention, a framework on which the ground drilling device may be arranged at start-up or in operation. The "carriage" according to the invention may be designed as a mobile unit.

The invention also provides a ground drilling device, which includes an above-mentioned device for clamping an element. The ground drilling device according to the invention may be any kind of ground drilling device, in particular a horizontal drilling device, whereby a percussion drilling device is preferred.

The invention also provides a method for clamping an element with a pressure chamber, which has a flexible wall section and a rigid wall section that acts as a counter-bearing. The method provides for a pressure medium to be passed into the pressure chamber, which causes a frictional connection between the jacket and the element to be clamped.

Moreover, the invention also provides a method for manufacturing a device for clamping an element, in particular of an above-described device, wherein an elastic jacket is radially pressure-joined with a rigid wall section.

Neither the above descriptions nor the following descriptions of exemplary embodiments constitute a relinquishment of certain embodiments or characteristics.

BRIEF DESCRIPTION OF THE DRAWINGS

The invention will now be described in more detail by way of the exemplary embodiments shown in the drawings.

DETAILED DESCRIPTION

Figure 1:
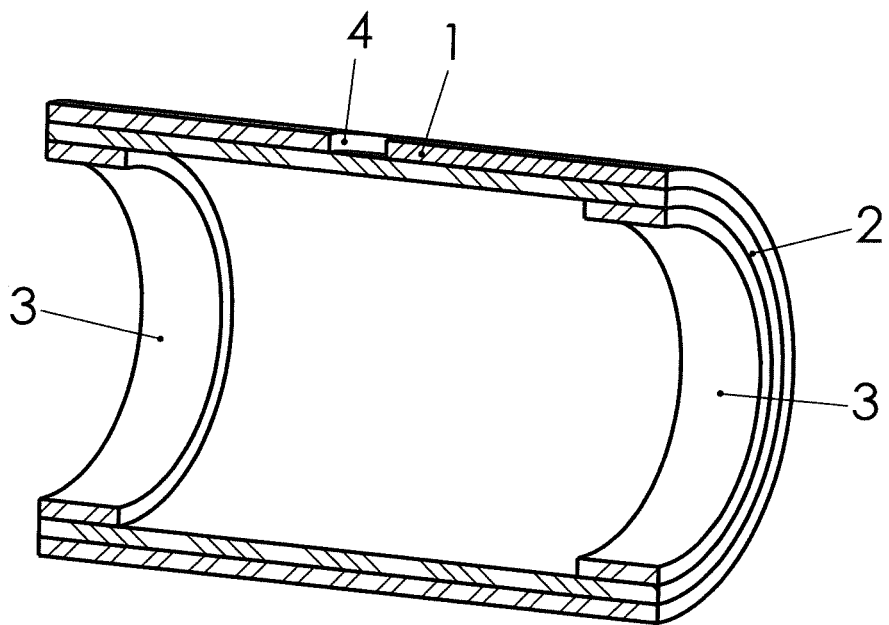
FIG. 1 shows an exemplary embodiment in isometric cross-section.

FIG. 1 depicts a first exemplary embodiment of a device for clamping an element, in which inside a rigid wall section 1, which takes the form of an airtight pipe, an elastic jacket 2 in form of an airtight tube is disposed. The elastic jacket 2 is pressure-joined at the end-faces of the pipe by means of radial force elements 3. The elastic jacket 2 is pressure-joined, impermeable to air, between the rigid wall section 1 and the radial force elements 3, which forms an airtight pressure chamber. For the supply of a pressure medium, in particular compressed air, a compressed air opening 4 is provided in the rigid wall section 1, which is connected to a pressure medium source (not shown).

In the exemplary embodiment shown in FIG. 1 the supply of a pressure medium into the pressure chamber causes an inwards-directed expansion of the elastic jacket 2, which may lead to an expansion of the jacket 2 in the form of a cushion that clamps or presses against the element. The rigid wall section 1 forms the counter-bearing and remains unchanged. An element located inside the device (not shown), which extends through the device, is clamped.

Figure 2:
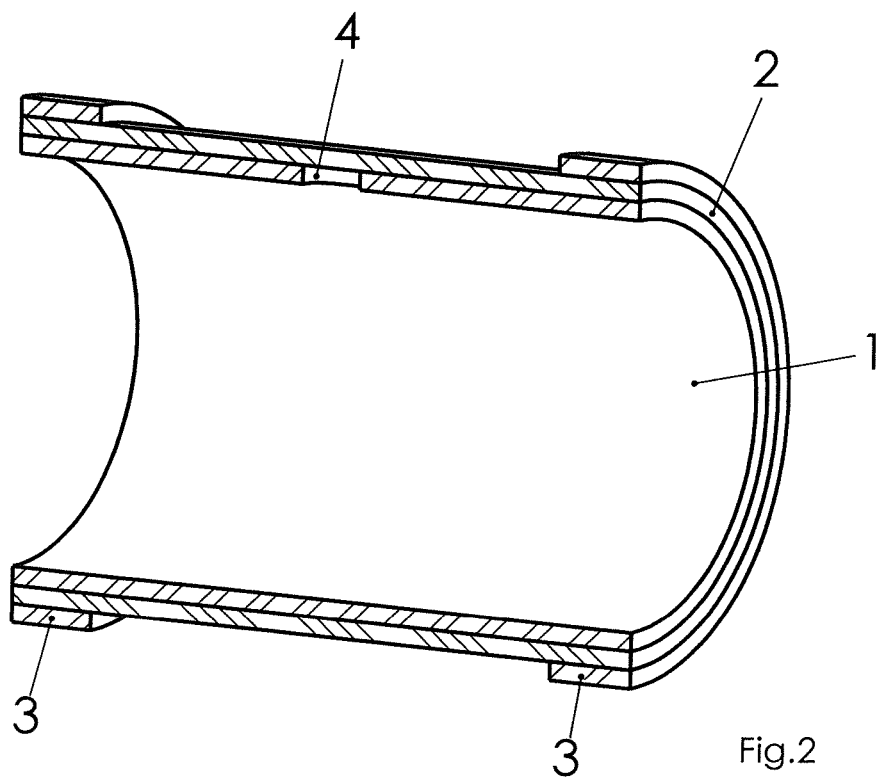
FIG. 2 shows a further exemplary embodiment in an isometric cross-section.

FIG. 2 depicts a second exemplary embodiment of a device for clamping an element, in which outside a rigid wall section 1, which takes the form of an airtight pipe, an elastic jacket 2 in form of an airtight tube is disposed. The elastic jacket 2 is pressure-joined at the end-faces of the pipe by means of radial force elements 3. The elastic jacket 2 is pressure-joined, impermeable to air, between the rigid wall section 1 and the radial force elements 3, which forms an airtight pressure chamber. For the supply of a pressure medium, in particular compressed air, a compressed air opening 4 is provided in the rigid wall section 1, which is connected to a pressure medium source (not shown).

In the exemplary embodiment shown in FIG. 2, the supply of a pressure medium to the pressure chamber causes an outwards-directed expansion of the elastic jacket 2. The rigid wall section 1 forms the counter-bearing and remains unchanged.

Figure 3:
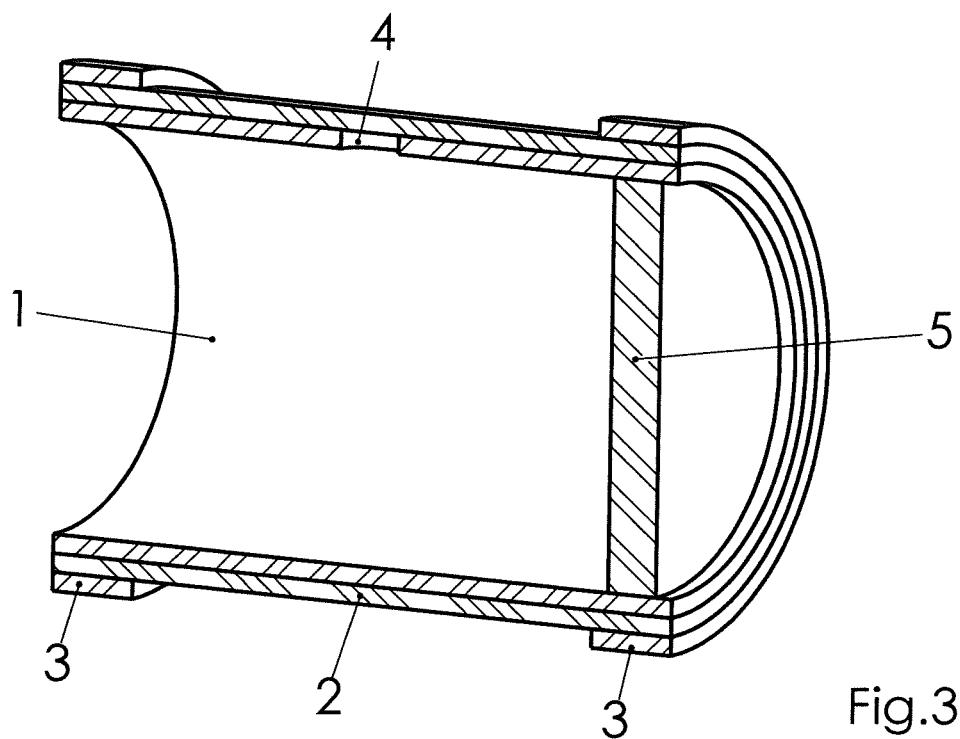
FIG. 3 shows a further exemplary embodiment in an isometric cross-section.

FIG. 3 depicts a further, third embodiment of a device for forming a fluid connection, in which a sealing element 5 is provided in the area of the pressure chamber adjoining the rigid wall section 1, where said sealing element is in contact with the tubular rigid wall 1. The pressure chamber or the pipe respectively is closed by means of the sealing element 5 in longitudinal direction of the pipe. The sealing element 5 is disposed at the edge of the pressure chamber. The sealing element 5 is disposed in the vicinity of a radial force element 3. Sealing element 5, elastic jacket 2, rigid wall 1 and radial force element 3 are connected to each other, preferably pressure-joined. Sealing element 5 forms a seal in longitudinal extension of the rigid wall 1.

Figure 4:
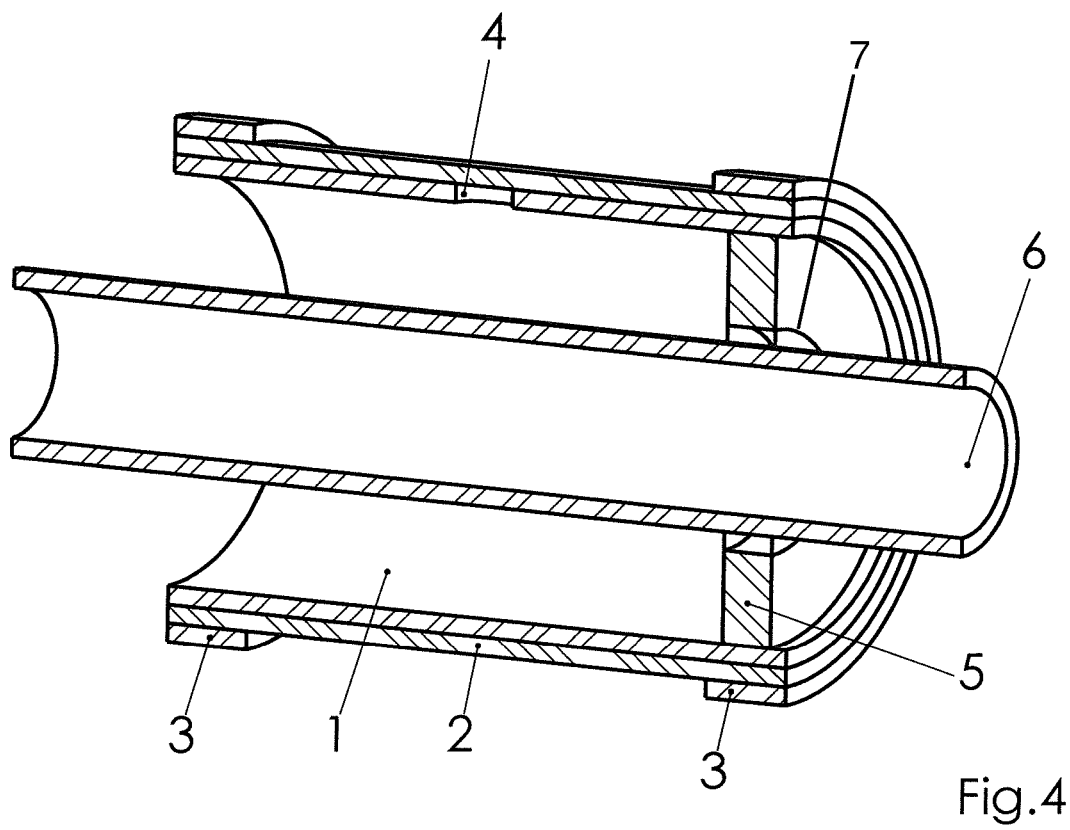
FIG. 4 shows a further exemplary embodiment in an isometric cross-section.

FIG. 4 depicts a further exemplary embodiment of the device for clamping an element, wherein the difference to the exemplary embodiment shown in FIG. 3 is that the sealing element 5 is provided with an opening 7. The opening 7 of the sealing element 5 is disposed centrally in the sealing element. The opening 7 may include a connector (not shown) that has a leak-proof connection with the opening. Device and connector form a section of the fluid connection.

Figure 5:
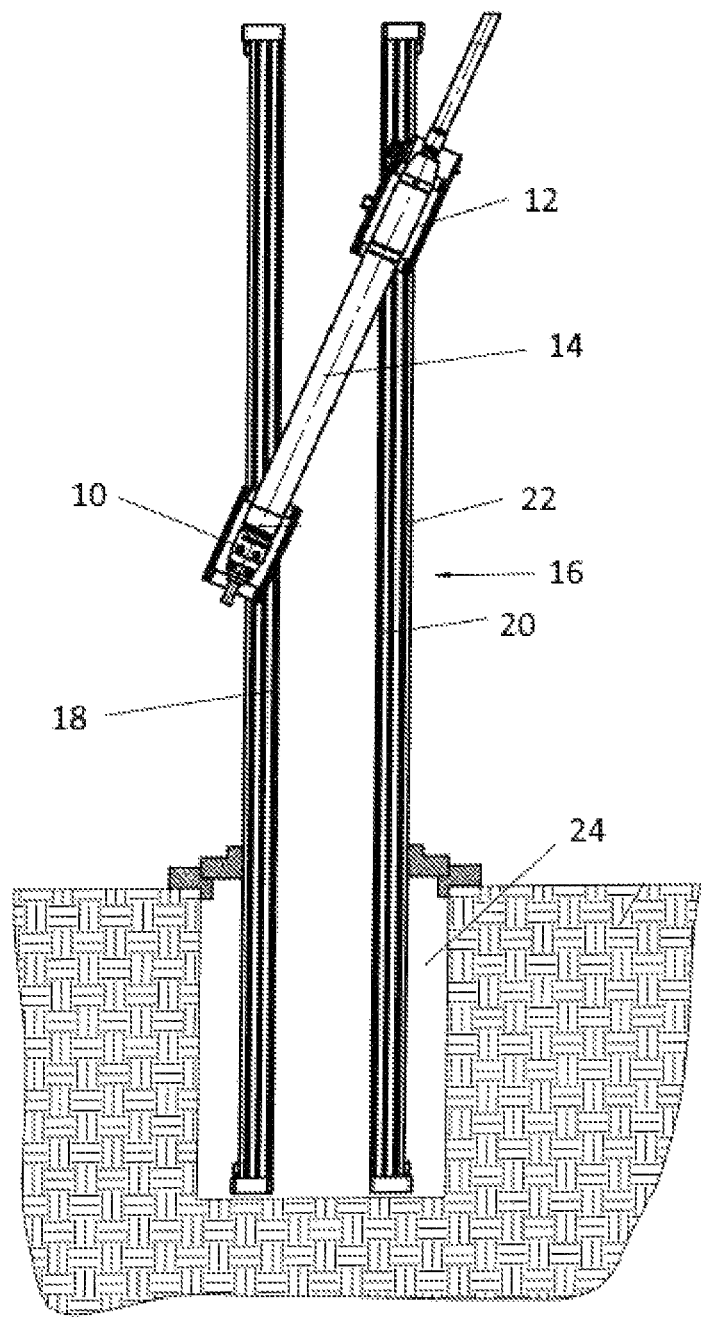
FIG. 5 shows devices for clamping a displacement hammer on a carriage.

As depicted in FIG. 5, multiple devices 10, 12 may be provided for clamping the element to be clamped. For example a displacement hammer 14 may be clamped by means of two or more devices 10, 12 that are located at a distance from each other. The devices may be fastened to a carriage 16. The devices 10, 12 may be moveable in tracks 18, 20 on the carriage, in particular on a framework 22 of the carriage 16. A translational motion of the device in tracks 18, 20 may be preferred in particular, wherein the guides may be oriented essentially vertical to be able, for example, to move the displacement hammer vertically in a launch pit 24 on or in the carriage 16. The selective "clamping" of the displacement hammer 14 and an independent translational movement of the device may lead to different inclinations of the displacement hammer, in particular with respect to the horizontal.

The invention claimed is:

1. A clamp configured to be movably fastened to a carriage for a horizontal ground drilling device having a framework on which the ground drilling device may be arranged at start-up or in operation, comprising:
a flexible section comprising an elastic jacket including a contact surface for contacting a housing of a percussion drilling device to be clamped, wherein the contact surface of the elastic jacket is adaptable to form a frictional connection with the housings of percussion drilling devices of different shapes and sizes;
a tubular rigid wall section;
a planar sealing element within the tubular rigid wall section; and
a radial force element coupled to the flexible section, said radial force element configured to form a pressure-tight connection between the elastic jacket and the rigid wall section;
wherein the flexible section is coupled to the rigid wall section to form a pressure chamber, and wherein the rigid wall section acts as a counter-bearing to said flexible section when a pressure medium is supplied to said pressure chamber to form a frictional connection between the elastic jacket and the housing of the percussion drilling device to be clamped; and wherein a circumferential edge of the sealing element contacts one of the elastic jacket or the rigid wall within the tubular rigid wall section.

2. The clamp of claim 1, wherein the radial force element has an annular section which is configured to enable the radial force element to take the form of a section or a segment of a pipe.

3. The clamp of claim 1, wherein the flexible section is coupled to an interior of the rigid wall section and moves inward relative to the rigid wall section as the pressure medium is supplied to the pressure chamber.

4. The clamp of claim 1, wherein the flexible section is coupled to an exterior of the rigid wall section and moves outward relative to the rigid wall section as the pressure medium is supplied to the pressure chamber.

5. The clamp of claim 1, wherein the elastic jacket comprises one of a single layer material and a laminated multilayer material.

6. The clamp of claim 1, wherein the sealing element is installed at an end of the clamp and is configured to act as a stopper to enclose the end of the clamp.

7. The clamp of claim 6, wherein the sealing element includes a connector for connecting to a pressure medium source to provide fluid communication via said connector between the pressure chamber and the pressure medium source.

8. The clamp of claim 6, wherein the sealing element includes an opening through which a portion of the housing of the percussion drilling device to be clamped may pass.

9. The clamp of claim 1, wherein the elastic jacket is configured to fully surround the housing of the percussion drilling device to be clamped.

10. The clamp of claim 1, wherein the elastic jacket is configured to partially surround the housing of the percussion drilling device to be clamped.

11. The clamp of claim 1, wherein one of the rigid wall section and the flexible section includes a connector for connecting to a pressure medium source.

12. A carriage for a horizontal ground drilling device having a framework on which the ground drilling device may be arranged at start-up or in operation including:
a device for clamping a housing of a percussion drilling device of the horizontal ground drilling device, the device for clamping being movably fastened to the carriage, comprising:
a tubular rigid wall section;
a planar sealing element within the tubular rigid wall section; and
a flexible section coupled to an interior of the tubular rigid wall section to form a pressure chamber, said flexible section comprising an elastic jacket including a contact surface for contacting the ground drilling device to be clamped, wherein the contact surface of the elastic jacket is adaptable to form a frictional connection with housings of percussion drilling devices of different shapes and sizes to be clamped;
wherein a circumferential edge of the sealing element contacts one of the elastic jacket or the rigid wall within the tubular rigid wall section; and
wherein said rigid wall section acts as a counter-bearing to said flexible section and said elastic jacket is configured to move inward relative to the rigid wall section as a pressure medium is supplied to the pressure chamber to form a frictional connection between the elastic jacket and the ground drilling device to be clamped.

13. The carriage of claim 12, wherein the clamp further includes a radial force element coupled to the flexible section, said radial force element configured to form a pressure-tight connection between the elastic jacket and the counter-bearing.

14. The clamp of claim 13, wherein the radial force element has an annular section which is configured to enable the radial force element to take the form of a section or a segment of a pipe.

15. The carriage of claim 12, wherein the device is movably fastenable to the carriage to adjust an inclination of the housing of the percussion drilling device of the horizontal ground drilling device being clamped.

16. The carriage of claim 12, further comprising a track fastened to the carriage vertical to the carriage, wherein the device for clamping is movably installed in the track for translational movement of the device for clamping to vertically move the percussion drilling device to be clamped in a launch pit or on the carriage.

17. The carriage of claim 12, wherein the device for clamping is adapted to apply a varying degree of clamping force based upon application of varying pressure to the pressure chamber.

18. The carriage of claim 17, wherein the pressure chamber is adapted to receive a pressure for applying an intermediary state of clamping force to the device for clamping which is less than a maximum clamping force, wherein the intermediary state of clamping force forms the frictional connection with the housing of the percussion drilling device even when the percussion drilling device is operated.

19. The carriage of claim 12, wherein the device for clamping comprises at least two devices for clamping which are located at a distance from each other.

20. The carriage of claim 19, wherein the devices for clamping are adapted to selectively clamp the housing of the percussion drilling device, and the devices for clamping are adapted to move translationally and independently of each other to determine different inclinations of the housing of the percussion drilling device with regard to horizontal.

21. A method for clamping a horizontal ground drilling device to a carriage having a framework on which the ground drilling device may be arranged at start-up or in operation comprising:
providing a device for clamping a housing of a percussion drilling device of the horizontal ground drilling device, the device for clamping being movably fastened to the carriage, including:
a tubular rigid wall section; and
a flexible section coupled to an interior of the tubular rigid wall section to form a pressure chamber, said flexible section comprising an elastic jacket including a contact surface for contacting the percussion drilling device to be clamped, wherein the contact surface of the elastic jacket is adaptable to form a frictional connection with the housing of percussion drilling devices of different shapes and sizes;
wherein said rigid wall section acts as a counter-bearing to said flexible section and said elastic jacket is configured to move inward relative to the rigid wall section as a pressure medium is supplied to the pressure chamber;
inserting a portion of the percussion drilling device into the clamp; and supplying the pressure medium to the pressure chamber to cause said elastic jacket to move inward to form the frictional connection between the contact surface of the elastic jacket and the portion of the percussion drilling device within the clamp.

22. The method of claim 21, wherein the clamp further includes a radial force element coupled to the flexible section, and wherein supplying the pressure medium to the pressure chamber further causes said radial force element to form a pressure-tight connection between the elastic jacket and the tubular rigid wall section.

23. The method of claim 21, further comprising fastening a track to the carriage essentially vertical to the carriage, and movably installing the device for clamping in the track for translational movement of the device for clamping to vertically move the percussion drilling device to be clamped in a launch pit or on the carriage.

24. The method of claim 21, wherein providing the device for clamping comprises providing the device for clamping that is adapted for applying a varying degree of clamping force based upon application of varying pressure to the pressure chamber.

25. The method of claim 24, wherein providing the device for clamping comprises providing the device for clamping in which the pressure chamber is adapted for receiving a pressure for applying an intermediary state of clamping force to the device for clamping which is less than a maximum clamping force, wherein the intermediary state of clamping force forms the frictional connection with the housing of the percussion drilling device even when the percussion drilling device is operated.

26. The method of claim 21, wherein providing a device for clamping comprises providing at least two devices for clamping which are located at a distance from each other.

27. The method of claim 26, wherein providing the at least two devices for clamping comprises providing the at least two devices for clamping that are adapted for selectively clamping the housing of the percussion drilling device and adapted for moving translationally and independently of each other for determining different inclinations of the housing of the percussion drilling device with regard to horizontal.

\* \* \* \* \*